United States Patent [19]

Scheffee

[11] 4,170,984

[45] Oct. 16, 1979

[54] SOLAR ENERGY HEAT COLLECTOR

[75] Inventor: Robert S. Scheffee, Lorton, Va.

[73] Assignee: Atlantic Research Corporation, Alexandria, Va.

[21] Appl. No.: 769,613

[22] Filed: Feb. 17, 1977

[51] Int. Cl.² ............................................. F24J 3/02
[52] U.S. Cl. ................................ 126/432; 165/104 M; 237/1 A; 252/71
[58] Field of Search ............... 126/270, 271; 237/1 A; 165/104 M; 252/71, 73, 67, 74, 75, 76, 77, 78, 78.5, 78.3; 137/2, 8, 10

[56] References Cited

U.S. PATENT DOCUMENTS

| 1,951,403 | 3/1934 | Goddard | 126/271 |
| 3,026,293 | 3/1962 | Caldwell et al. | 260/883 X |
| 3,145,707 | 8/1964 | Thomason | 126/271 |
| 3,146,774 | 9/1964 | Yellott | 126/271 |
| 3,239,000 | 3/1966 | Meagher | 126/271 X |
| 3,492,229 | 1/1970 | Weiss | 252/76 X |
| 3,590,102 | 6/1971 | Süling et al. | 260/883 |
| 3,918,430 | 11/1975 | Stout et al. | 126/271 |
| 3,939,819 | 2/1976 | Minardi | 126/271 |
| 3,951,837 | 4/1976 | Sheratte | 252/77 X |
| 3,981,294 | 9/1976 | Deminet et al. | 126/271 |
| 3,981,813 | 9/1976 | Den Herder et al. | 252/73 X |
| 4,047,518 | 9/1977 | Anderson | 126/271 |
| 4,056,092 | 11/1977 | Meier et al. | 126/271 |
| 4,074,705 | 2/1978 | Robinson, Jr. et al. | 126/271 |
| 4,083,490 | 4/1978 | Cunningham et al. | 126/271 |
| 4,098,331 | 7/1978 | Ford et al. | 126/271 |

OTHER PUBLICATIONS

*University Physics*, Third Ed., Addison–Wesley Publishing Co., Reading, Mass. 1964, pp. 320, 321.
"Performance of a Black Liquid Flat Plate Solar Collector", Solar Energy vol. 17, pp. 179–183, Minardi et al.
Handbook of Chemistry and Physics, Weast, CRC Press, Cleveland, Ohio, p. F–56, 1976.

*Primary Examiner*—Samuel Scott
*Assistant Examiner*—Larry Jones
*Attorney, Agent, or Firm*—Martha L. Ross

[57] ABSTRACT

A gravity-flow, sheet-flow solar heat collector wherein the heat-absorbent medium is a dark fluid having a minimum viscosity of about 10 centipoise at 120° F.

72 Claims, 5 Drawing Figures

SOLAR ENERGY HEAT COLLECTOR

BACKGROUND

Gravity flow, sheet flow solar heat collectors having various configurations of water flow, e.g., flat sheet, corrugated channels and the like, and various heat-absorbent media for transferring heat to the fluid, e.g., metal, dark-colored plastic and the like, have been suggested in the prior art. However, despite certain advantages which such collectors have over the expensive tubular collectors, in such terms as reduced leakage and lower construction costs, they have not been practically feasible for use in the temperate to frigid latitudes.

In such latitudes, for optimum radiation absorption, the collector must be tilted to a substantial angle relative to the horizontal so as to be substantially perpendicular to the rays of the sun at solar noon. At such angles, gravitational effects on the water, which is used because of its high specific heat, cause such high flow velocities that exposure time per pass through the collector panel (typically 4 by 8 feet) and, thereby, the amount of heat absorbed is exceedingly low. The large number of passes per unit of time required to absorb an adequate amount of heat energy results in power input requirements which are very high relative to the energy output, rendering the system excessively inefficient in terms of costly energy input. The high flow rates also result in excessively noisy systems which wear out relatively quickly. Additionally, because of the low exposure time per pass, the difference between panel input and output fluid temperatures ($\Delta T$) requires exceedingly $\Delta T$-sensitive, costly switch devices for shutting off operation of the collector during night hours or adverse cloud conditions.

Minardi et al, U.S. Pat. No. 3,939,819, and Minardi et al, *Performance of a "Black" Liquid Flat-Plate Solar Collector*, Solar Energy, Volume 17, pages 179–183, disclose the use of "black" liquids as the direct radiant heat energy absorbent, thus eliminating the requirement for an intermediate heat absorbent, e.g., metal or dark-colored plastic (coated or per se), with resultant reduction in over-all system temperature and reduced panel weight. The panel system disclosed is a tubular system employing transparent tubing for fluid passage. The fluid is pumped through the tubing. Passing reference is made to use of the "black" fluid medium in sheet-flow, and FIG. 4 in U.S. Pat. No. 3,939,819 shows a gravity sheet flow system tilted at an angle of 43°. The references are devoid of any reference to viscosity of their fluids or its effect on sheet flow. It should be noted that increased fluid viscosity is detrimental to non-gravity flow devices. The highest viscosity fluid disclosed by the Minardi et al references consists of 3 parts of ethylene glycol, which is employed as an antifreeze, admixed with 1 part of a water mixture made by dispersing 91 parts of Acheson's Aquadag (a dispersion of colloidal graphite in water). Viscosity of this mixture, as measured at 120° F., equals 7 centipoise.

Goddard U.S. Pat. No. 1,951,403 discloses a tubular collector wherein the heat-absorbent medium is a reservoir of an oil suspension containing carbon. The tubes, which carry a different heat-absorbent liquid presumably the conventional water, are embedded in the oil/C reservoir. Goddard does not indicate the reason for selecting his particular reservoir medium and is silent concerning viscosity. Although the oil suspension may have the higher viscosities required by the present invention, viscosity plays no role in the reference collector system.

SUMMARY OF THE INVENTION

The invention comprises a gravity-flow, sheet flow solar energy collector panel comprising an insulated base; a bottom fluid-flow surface, which is preferably reflective, e.g., white or covered with a sheet of reflective metal foil such as aluminum, to prevent excessive heating of the collector when dry; a space above the bottom fluid-flow surface to provide for liquid flow; a first transparent solid sheet or window above the fluid surface and a second transparent sheet or window above the first window to minimize loss of heat by radiation; top, bottom and side walls; an inlet header at the top of the panel for feeding the liquid onto the fluid-flow surface; and a collector chamber and outlet therefrom for the fluid drainage at the bottom. The fluid is preferably, though not necessarily, divided into longitudinal channels by attaching laterally spaced longitudinal ridges or dividers to the lower fluid-flow surface. Such channeling has the advantages of compensating for any "out-of-plumb" characteristics of the base of the panel and improving the ease of obtaining flooded flow, infra. The first transparent window is preferably, though not essentially, positioned at a height from the lower fluid-flow surface equal to the operating depth of the fluid medium and made of substantially rigid material, such as plexiglass, so that flooded flow results. By "flooded flow" is meant that the fluid substantially completely fills the volume of the flow channel between the bottom fluid-flow surface and the first window. The advantage of such flooded flow is elimination of fogging. Open flow can also be used, though preferably in warmer climates and with high viscosities relative to the minimum.

The minimum viscosity of the fluid should be at least about 10 cp at 120° F., namely at a typical average operating temperature of the collector, and preferably at least about 20 cp at 120° F. Maximum viscosities are not critical and are determined by such factors as the type and size of the particular pump used, e.g., centrifugal or positive displacement, the maximum economy in terms of the ratio of total solar energy intake to pump energy required (S/P) for the particular system, including tilt angle, and the like.

The fluid is preferably water, which has a viscosity of 1 cp at normal temperature but high specific heat. Its radiant heat energy absorption is greatly increased by darkening it, as, for example, by means of finely divided carbon, graphite, and India ink, or pigments, such as lead sulphide, copper oxide, nickel black (oxides of Ni and Zn) antimony sulfide, which have high values of absorptivity at short wave lengths and low emissivity at long wave lengths, as well as other dark-colored pigments; dark water-soluble dyes; and the like. The desired elevated viscosities can be obtained in various ways known to the art, as, for example, use of high concentrations of carbon or other pigments; colloidalizing resins, such as guar gums, polyvinyl alcohol, polyacrylamide, carboxy vinyls (Carbopol resins), and the like; water glass; and the like. The carboxy vinyls are particularly desirable because of their relatively low temperature coefficient of viscosity and long shelf life. Other fluids can be used instead of water, such as oils and other organic liquids, e.g., mixtures of kerosene and No. 6 fuel oil, appropriately darkened as described above and thickened by suitable thickening agents, such as oil-soluble polymers where required. The fluid may also have antifreeze properties, which can be either inherent in the particular fluid medium or by addition, e.g., to water, of freezing point depressants such as ethylene glycol, salts such as $CaCl_2$, or other commercially available antifreeze compositions.

It is desirable that the channels drain substantially completely when the system is switched off so as to prevent drying of patches of the collector fluid on channel surfaces, which might overheat or freeze during exposure when the system is not in operation. This can be accomplished, for example, by the use of fluids and channel surfaces which are not mutually wettable.

Advantages of the present system include, but are not limited to, the following:

1. It makes practical any tilt angle required for optimum performance in the temperate to frigid zones as determined by latitude.
2. It provides great economy in terms of costly power input to achieve a given desired temperature or total heat energy absorption of the fluid in the storage tank. This is due to the greatly increased exposure time with resultant increased $\Delta T$ per pass through the collector panel; the resultant reduced number of passes; the lower pump and motor energy requirements in terms of brake horse power (BHP) and kilowatts (KW) respectively; and the greatly increased ratio of total solar energy absorption to pump energy ratio (S/P).
3. Fluid flow is from top to bottom for lower system fluid pressure and therefore reduced leakage and improved capability for using weaker and, therefore, lower cost materials of construction.
4. It provides lower system temperatures with resultant greater collector efficiency.
5. It makes possible the use of wood or all-plastic one-piece construction of the base and sides with resulting low unit cost.
6. The use of viscous fluid in the storage tank promotes thermal stratification by suppressing thermal turbulance, so that tank temperature distribution is more a function of the fluid thermal diffusivity rather than thermal convection currents. Thermal stratification permits minimum fluid temperature in the stream being pumped to the collectors, and thus promotes maximum collector efficiency.
7. The cost of the collector panel is a relatively small fraction of the cost of tubular units presently in use.
8. For gravity-flow collectors, the elevated viscosities permit the use of smaller and therefore less costly motors and pumps.
9. The lower fluid flow rates reduce system noise and promote longevity.
10. The substantially higher $\Delta T$ per pass makes possible the use of less sensitive and, therefore, less costly devices for switching the system off at night or during cloudy weather.

DRAWINGS

DETAILED DESCRIPTION

Figure 1:
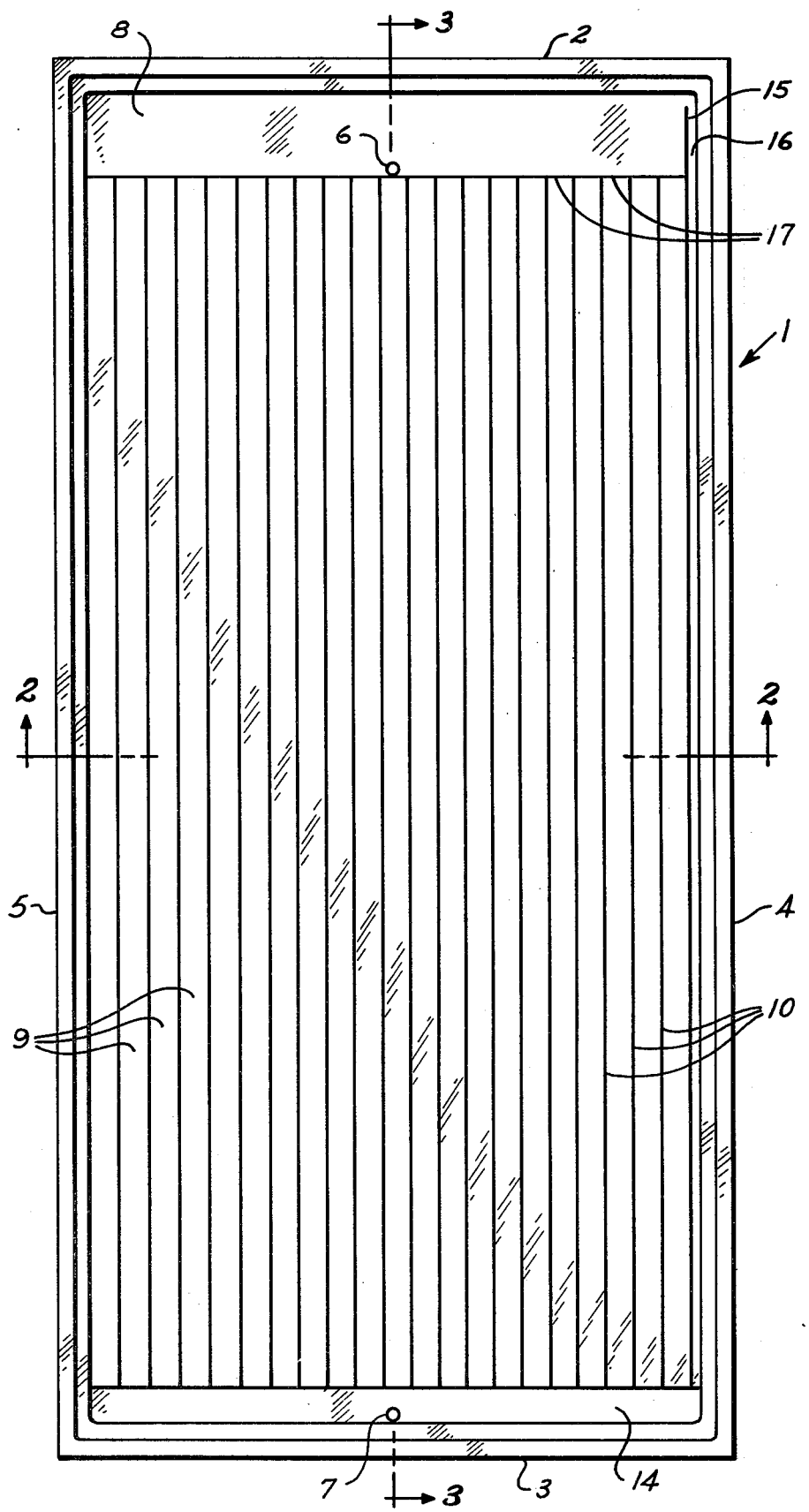
FIG. 1 is a top view of an embodiment of the solar heat collector panel.

Table I is a summary of viscosity effects given selected parameters for both centrifugal pumps and positive displacement pumps. The selected parameters include:

1. 1000 square feet of collector area.
2. Collector panel fluid flow surface dimensions are 4' wide × 8' long.
3. Collector channels are 0.05 in. deep.
4. Total dynamic head equals 30 feet.
5. The specific gravity of the fluids equals 1.0.
6. An induction motor is used with both the centrifugal and positive displacement pumps.
7. The collectors are operated for a period of 5 hours during the middle of the day at an average collector fluid temperature of 120° F., an average ambient temperature of 42° F., and an average value of total solar radiation on the tilted surface of 200 BTU/hr-ft². At these conditions, preliminary evaluation of the collector tested in the Example, infra, yields a collector efficiency of 41%, so that total heat collected is 410,000 BTU.
8. The flow rates are for flooded channel flow which in this case provides a total volume of 31.2 gallons per pass.
9. The exposure times are the quotient of panel length, 8 feet, divided by the flooding velocity.
10. The values of fluid temperature rise ($\Delta T$) as it is pumped through the panel are based on an average fluid collector temperature of 120° F.
11. The brake horse power, BHP, of the centrifugal pump is the quotient of the hydraulic horse power divided by the pump efficiency.
12. The pump efficiency of the positive displacement pump, e.g., a Moyno pump, is estimated to be 33% and constant for all viscosities.
13. The ratio of the total solar heat (S) taken up by the system in KBTU to the total pump energy (P) required is given in the last two columns and is a measure of the energy economy of the system. The larger the figure, the greater is the economy.
14. The fluid viscosities used are those at 120° F.

The relationships employed in deriving the data given in Table I are as follows:

Mass flow rate $\dot{m}$ of fluid flowing down a single flooded collector:

$$\dot{m} = I\eta Lw/Cp\Delta T \quad (1)$$

where
 I = Intensity of solar radiation on the surface of the collector (200 BTU/hr-ft²)
 $\eta$ = collector efficiency (0.41)
 L = collector panel length (8 ft)
 w = collector panel width (4 ft)
 $\Delta T$ = temperature rise
 Cp = specific heat of fluid (water = 1 BTU/lb-°F.)

Mass flow rate is converted into volumetric flow rates by dividing by the fluid density or specific gravity of the fluid (water) at operating temperature (120° F.).

In the gravity-flow, flooded flow collector, the required viscosity (or the required $\dot{m}$) is calculated by means of equation (2) which balances the gravitational force on the fluid with the force of fluid friction:

$$\mu = w y^3 \rho^2 g \sin \alpha / 12\dot{m} \quad (2)$$

where
y = depth of fluid (0.05/12 ft)
ρ = fluid density
g = gravitational acceleration = $4.17 \cdot 10^8$ ft/hr$^2$
α = collector tilt angle
ṁ = mass flow rate per panel
μ = viscosity in lb/ft-hr
12 = coefficient for frictional loss in stream-lined flooded flow.

The equation for open flow is similar to that for flooded flow except the coefficient for friction loss in stream-lined open flow is 3.

provide greater power cost savings. Initial cost savings for both pump and motor are additionally obtained because of the smaller sizes needed, as can be seen from the Table.

It can further be seen from Table I that ΔT per unit length, for given operating parameters of the collector, increases with increasing viscosity of the fluid and that by appropriate increases in viscosity, tilt angles up to 90° can be employed.

In general, viscosity ranges of about 10 to 10,000 cp can be employed to obtain the practical advantages of the present invention. Preferably the range is about 20 to 1000 cp at 120° F.

Table I

| Collector Tilt Angle, Deg. | Fluid Viscosity cp | Fluid Flow Rate, gpm | Exposure Time, sec/gpm | ΔT panel, °F. | Pump Size, BHP | Pump Efficiency, % | Centrifugal Pump Motor Size, KW | S/P Centrifugal KBTU/KWH | S/P pos.dis. KBTU/KWH |
|---|---|---|---|---|---|---|---|---|---|
| 25 | 1 | 431 | 4.4 | 0.380 | 4.24 | 77 | 3.72 | 22.0 | 9.43 |
|  | 10 | 43 | 44 | 3.81 | 0.74 | 44 | 0.73 | 112 | 84.2 |
|  | 13.8 | 31 | 60 | 5.28 | 0.56 | 42 | 0.56 | 146 | 115 |
|  | 20 | 21.5 | 87 | 7.62 | 0.44 | 37 | 0.44 | 186 | 166 |
|  | 32 | 13.5 | 139 | 12.1 | 0.42 | 24 | 0.41 | 200 | 275 |
|  | 43 | 10 | 187 | 16.4 | 0.47 | 16 | 0.47 | 174 | 359 |
|  | 66 | 6.5 | 287 | 25.2 | 0.56 | 8.8 | 0.56 | 146 | 548 |
| 35 | 1 | 594 | 3.2 | 0.276 | 5.56 | 81 | 4.88 | 16.8 | 6.84 |
|  | 10 | 59 | 32 | 2.78 | 0.89 | 50 | 0.88 | 93.2 | 61.5 |
|  | 19 | 31 | 60 | 5.28 | 0.57 | 41 | 0.56 | 146 | 118 |
|  | 32 | 18.6 | 101 | 8.80 | 0.48 | 30 | 0.48 | 171 | 188 |
|  | 43 | 13.8 | 138 | 11.9 | 0.52 | 20 | 0.51 | 161 | 266 |
|  | 66 | 9 | 211 | 18.2 | 0.61 | 11 | 0.60 | 137 | 411 |
| 45 | 1 | 719 | 2.6 | .228 | 6.72 | 81 | 5.89 | 13.9 | 5.66 |
|  | 10 | 72 | 26 | 2.27 | 1.01 | 54 | 1.00 | 82.0 | 50.1 |
|  | 23 | 31 | 60 | 5.28 | 0.61 | 38 | 0.61 | 134 | 116 |
|  | 32 | 22.5 | 83 | 7.28 | 0.54 | 32 | 0.53 | 155 | 160 |
|  | 43 | 17 | 112 | 9.63 | 0.54 | 24 | 0.53 | 155 | 160 |
|  | 66 | 11 | 172 | 14.9 | 0.59 | 14 | 0.59 | 139 | 328 |
| 55 | 1 | 833 | 2.2 | .197 | 7.89 | 80 | 6.92 | 11.8 | 4.89 |
|  | 10 | 83 | 22 | 1.97 | 1.17 | 54 | 1.16 | 70.7 | 43.2 |
|  | 20 | 42 | 45 | 3.90 | 0.79 | 40 | 0.79 | 104 | 85.5 |
|  | 32 | 26 | 72 | 6.30 | 0.55 | 36 | 0.55 | 149 | 138 |
|  | 43 | 19 | 97 | 8.62 | 0.55 | 26 | 0.55 | 149 | 189 |
|  | 66 | 13 | 148 | 12.6 | 0.65 | 15 | 0.64 | 128 | 276 |
| 90 | 1 | 1016 | 1.8 | 0.61 | 10.10 | 76 | 8.86 | 9.26 | 4.02 |
|  | 10 | 102 | 18 | 1.61 | 1.42 | 54 | 1.41 | 58.2 | 35.2 |
|  | 20 | 51 | 37 | 3.21 | 0.90 | 43 | 0.89 | 92.1 | 70.4 |
|  | 32 | 31 | 59 | 5.28 | 0.65 | 36 | 0.64 | 128 | 116 |
|  | 43 | 24 | 80 | 6.82 | 0.58 | 31 | 0.57 | 144 | 150 |
|  | 66 | 15 | 122 | 10.92 | 0.67 | 18 | 0.67 | 122 | 240 |

Figure 4:
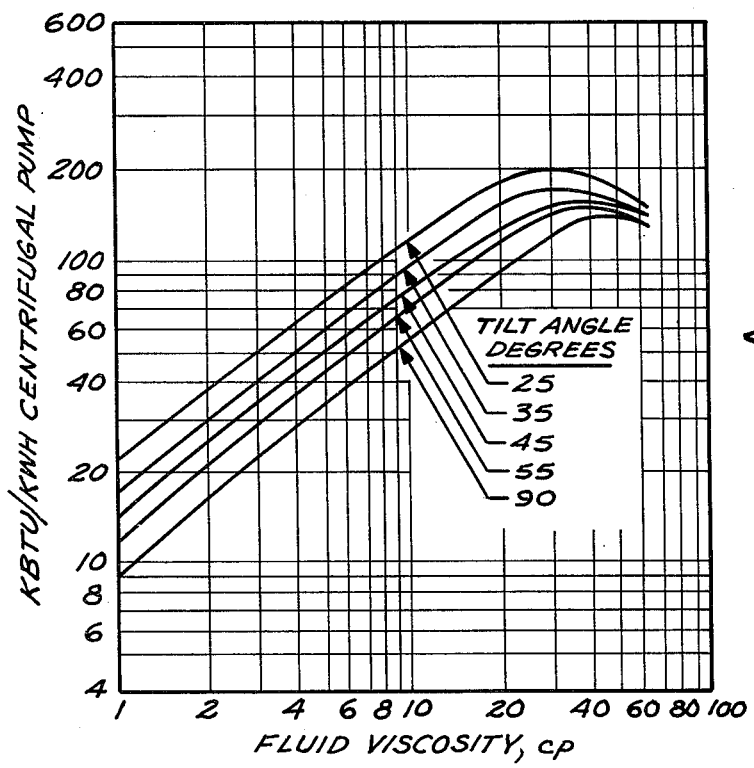
FIG. 4 is a graph showing the calculated effect of viscosity on S/P ratio as a function of collector tilt angle, employing a centrifugal pump.
Figure 5:
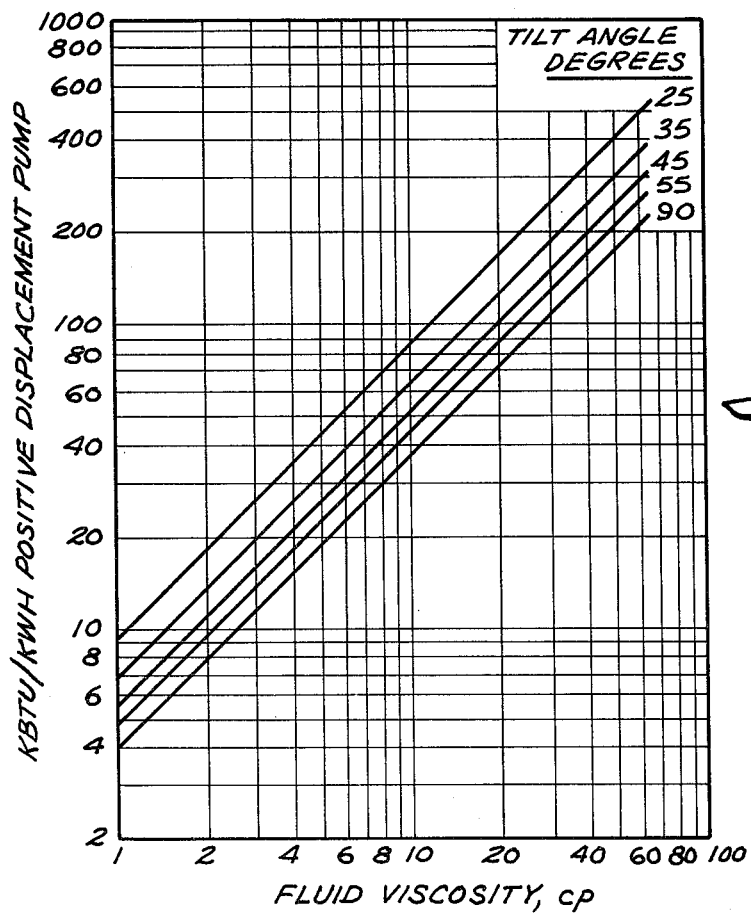
FIG. 5 is a graph similar to FIG. 4 but employs a positive displacement pump.

The increases in economy efficiencies provided by increased viscosities in terms of the ratio of total solar energy absorbed vs. pump energy input is readily seen from the last two columns of the Table and in the graphs of FIGS. 4 and 5. It will be noted that, in the case of the centrifugal pump, the maximum S/P ratio, which corresponds to the system that collects the maximum amount of solar energy per KW of pump power, is, for the given condition parameters, achieved at a viscosity of 32 cp at 120° F. for all tilt angles except 90° where the optimum viscosity is 43 cp at 120°. It should also be noted, however, that improved economy is obtained at even higher viscosities, and that optimum viscosities will change with different parameters, such as fluid depth, operating temperature, etc.. In the case of the positive displacement pump, S/P ratio continues to increase with increasing viscosities, with the maximum not reached until viscosity is greater than about 1000 cp, where the pump, such as the Moyno pump, reacts to viscosity. From the point of view of initial cost and maintenance, the centrifugal pump generally is most economical. However, the positive displacement pump, though substantially higher in initial cost, can The advantage of dividing the sheet flow pattern into a plurality of longitudinal channels has been discussed supra. The depth of the channel for flooded flow is not critical. It is influenced by such variables as viscosity, rate of flow, particular pump design, angle of tilt, and the like. Optimum operating depths can be determined by routine calculation and experimentation. In general, the viscosity for maximum S/P increases with cube of channel depth.

EXAMPLE

A fluid of elevated viscosity was produced from the following components:
Water—99.08%
Polyacrylamide—0.36%
Carbon black—0.10%
Surfactant (Tamol SN)—0.10%
NaOH (stabilizer for C)—0.36%

The composition was diluted with sufficient water to produce two fluids having respective viscosities of 3 cp and 16 cp at 120° F.

A solar heat collector panel was built comprising five longitudinal channels separated by thin plastic dividers and having dimensions: 1.84" wide×0.023" deep×44" long. The bottom (flow surface) and top (top fluid flooding surface) channel faces were made of ⅛" thick plexiglass. A sheet of aluminum foil was positioned between the lower sheet and the insulation to provide reflectivity. The upper sheet rested on the top edges of the channel dividers. The base of the panel was insulated with 1" of polystyrene foam. A window made of 6 mil acrylic film was positioned about 1" above the upper channel face. The enclosure was completed by four sides of wooden plank with appropriate sealing. A header ½" deep×6" long×12" wide was positioned at the top across the top channel entrances. The header was open at the bottom to provide a slit for feeding fluid into the channels. The panel faced south and was tilted at an angle of 45°, namely substantially perpendicular to the rays of the sun at solar noon. When fluid was fed by centrifugal pump into the header, the header filled to a level providing about a 3" static head at the channel entrances. This small head appeared to be necessary to overcome the entrance pressure drop. Flow was uniform down the flooded channels. Flooding flow rate for the 3 cp fluid was 0.150 gpm/sq. ft., corresponding to a flooding velocity of 3.8 in./sec. and an exposure time of 11 sec. in the 44" channels. The flooding flow rate for the 16 cp fluid was 0.024 gpm/sq. ft. for a flooding velocity of 0.63 in./sec. and a panel exposure time of 70 sec. The S/P value for the 3 cp fluid was 34 and for the 16 cp fluid 120. For the 3 cp, ΔT was 2.5° F. and for the 16 cp, ΔT was 17° F. Collector efficiency was calculated to be 41% at 120° F. for both fluids.

Figure 2:
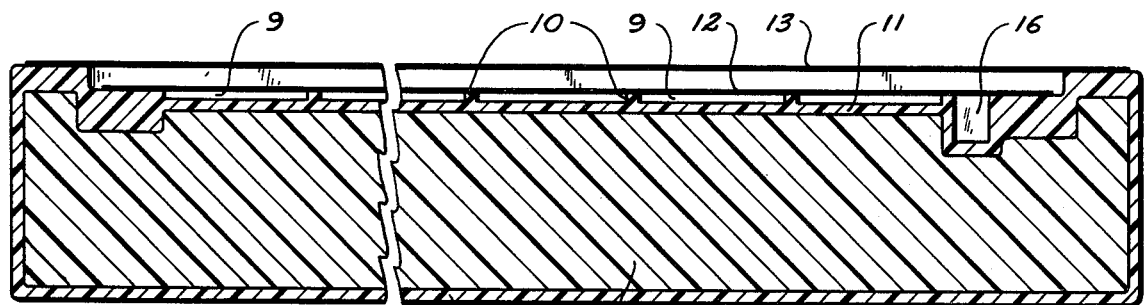
FIG. 2 is a cross-section taken at 2—2 of FIG. 1.
Figure 3:
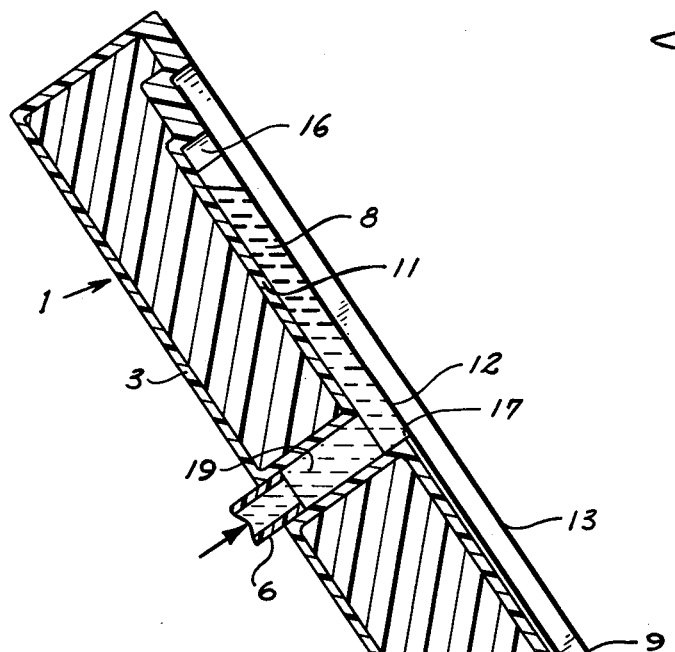
FIG. 3 is a side elevation in longitudinal section taken at 3—3 of FIG. 1.

In FIG. 1, the solar heat collector panel 1 comprises a rectangular box with top and bottom side walls 2 and 3, respectively, and lateral walls 4 and 5. Inlet and outlet tubes at top and bottom are 6 and 7, respectively. Inlet tube 6 fills top header 8. The panel is divided longitudinally into a plurality of longitudinal channels 9 by longitudinal dividers 10 attached to bottom fluid flow surface 11, which is preferably of light color, e.g., white, or coated with a reflective metal, e.g., Al . Transparent sheet or window 12, preferably made of a transparent plastic such as plexiglass, is shown resting on the tops of channel dividers 10, thereby forming an upper channel 9 closure and permitting flooded flow if desired. As shown in FIGS. 2 and 3, solid first transparent sheet or window 12 extends across the entire fluid flow area of the collector at a spaced distance from the bottom fluid-flow surface 11 and is peripherally attached in sealing relationship to the lateral and end walls of the panel, thereby permitting said flooded flow in the volume between the upper surface of bottom surface 11 and the lower surface of window 12. The described arrangement of said first transparent window 12 is conventionally the case in sheet-flow, gravity-flow solar panels. Transparent sheet or window 13, preferably made of a transparent plastic, is employed to retain the heat generated within the system. Lower chamber 14 receives the fluid circulated in the channels and passes it out through exit tube 7. Header 8 is provided with overflow baffle 15 to provide an overflow channel 16 to limit the liquid in the header to a desired static head and to equalize pressure at the header and drain. Header 8 is provided at its bottom with a horizontal slit 17 opening across the top entrances of the channel. The base of the panel is filled with insulation material 18, such as polystyrene, polyurethane, glass wool batt, and the like. The course of liquid 19 flow is shown in FIG. 3.

Although this invention has been described with reference to illustrative embodiments thereof, it will be apparent to those skilled in the art that the principles of this invention can be embodied in other forms but within the scope of the claims.

I claim:

1. In a gravity-flow, sheet-flow, solar-energy collector including a bottom fluid-flow surface lateral and end walls, a fluid inflow header, a fluid outflow chamber and a first solid, substantially rigid transparent sheet or window which extends across the entire fluid flow area of the collector at a spaced distance from the bottom fluid-flow surface and is peripherally, sealingly attached to the lateral and end walls of the collector, the improvement wherein the fluid flowing in the collector is a dark liquid having a predetermined viscosity which is at least about 10 Cp at 120° F.; said first transparent solid sheet is at a predetermined distance from the bottom fluid-flow surface; the space between said bottom surface and said transparent first sheet is flooded with said fluid; and said fluid inflow header is provided with overflow means to produce a desired head and to equalize pressure in said header and outflow chamber; said predetermined viscosity being sufficiently high, given other variable operating conditions of said collector, to provide a desired temperature differential per unit length of said collector over a tilt angle range up to about 90°.

2. The collector of claim 1 wherein the minimum viscosity is about 20 Cp at 120° F.

3. The collector of claim 1 wherein the liquid is water containing material which increases viscosity and imparts a dark color to the liquid.

4. The collector of claim 2 wherein the liquid is water containing material which increases viscosity and imparts a dark color to the liquid.

5. The collector of claim 1 wherein the dark color is imparted by finely divided carbon or graphite.

6. The collector of claim 2 wherein the dark color is imparted by finely divided carbon or graphite.

7. The collector of claim 3 wherein the dark color is imparted by finely divided carbon or graphite.

8. The collector of claim 4 wherein the dark color is imparted by finely divided carbon or graphite.

9. The collector of claim 1 which has a plurality of laterally spaced longitudinal channels separated each from the other by longitudinal dividers which are substantially perpendicular to the bottom fluid-flow surface.

10. The collector of claim 2 which has a plurality of laterally spaced longitudinal channels separated each from the other by longitudinal dividers which are substantially perpendicular to the bottom fluid-flow surface.

11. The collector of claim 3 which has a plurality of laterally spaced longitudinal channels separated each from the other by longitudinal dividers which are substantially perpendicular to the bottom fluid-flow surface.

12. The collector of claim 4 which has a plurality of laterally spaced longitudinal channels separated each from the other by longitudinal dividers which are substantially perpendicular to the bottom fluid-flow surface.

13. The collector of claim 5 which has a plurality of laterally spaced longitudinal channels separated each from the other by longitudinal dividers which are substantially perpendicular to the bottom fluid-flow surface.

14. The collector of claim 6 has a plurality of laterally spaced longitudinal channels separated each from the other by longitudinal dividers which are substantially perpendicular to the bottom fluid-flow surface.

15. The collector of claim 7 which has a plurality of laterally spaced longitudinal channels separated each from the other by longitudinal dividers which are substantially perpendicular to the bottom fluid-flow surface.

16. The collector of claim 8 which has a plurality of laterally spaced longitudinal channels separated each from the other by longitudinal dividers which are substantially perpendicular to the botom fluid-flow surface.

17. The collector of claim 9 wherein said transparent sheet covers said channels in substantially abutting relationship to the upper ends of said dividers.

18. The collector of claim 10 wherein said transparent sheet covers said channels in substantially abutting relationship to the upper ends of said dividers.

19. The collector of claim 11 wherein said transparent sheet covers said channels in substantially abutting relationship to the upper ends of said dividers.

20. The collector of claim 12 wherein said transparent sheet covers said channels in substantially abutting relationship to the upper ends of said dividers.

21. The collector of claim 13 wherein said transparent sheet covers said channels in substantially abutting relationship to the upper ends of said dividers.

22. The collector of claim 14 wherein said transparent sheet covers said channels in substantially abutting relationship to the upper ends of said dividers.

23. The collector of claim 15 wherein said transparent sheet covers said channels in substantially abutting relationship to the upper ends of said dividers.

24. The collector of claim 16 wherein said transparent sheet covers said channels in substantially abutting relationship to the upper ends of said dividers.

25. The collector of claim 1 wherein said overflow means is a baffle.

26. The collector of claim 2 wherein said overfflow means is a baffle.

27. The collector of claim 3 wherein said overflow means is a baffle.

28. The collector of claim 4 wherein said overflow means is a baffle.

29. The collector of claim 5 wherein said overflow means is a baffle.

30. The collector of claim 6 wherein said overflow means is a baffle.

31. The collector of claim 7 wherein said overflow means is a baffle.

32. The collector of claim 8 wherein said overflow means is a baffle.

33. The collector of claim 9 wherein said overflow means is a baffle.

34. The collector of claim 10 wherein said overflow means is a baffle.

35. The collector of claim 11 wherein said overflow means is a baffle.

36. The collector of claim 12 wherein said overflow means is a baffle.

37. The collector of claim 13 wherein said overflow means is a baffle.

38. The collector of claim 14 wherein said overflow means is a baffle.

39. The collector of claim 15 wherein said overflow means is a baffle.

40. The collector of claim 16 wherein said overflow means is a baffle.

41. The collector of claim 17 wherein said overflow means is a baffle.

42. The collector of claim 18 wherein said overflow means is a baffle.

43. The collector of claim 19 wherein said overflow means is a baffle.

44. The collector of claim 20 wherein said overflow means is a baffle.

45. The collector of claim 21 wherein said overflow means is a baffle.

46. The collector of claim 22 wherein said overflow means is a baffle.

47. The collector of claim 23 wherein said overflow means is a baffle.

48. The collector of claim 24 wherein said overflow means is a baffle.

49. The collector of claim 1 wherein the fluid and the fluid flow surfaces of said collector are mutually substantially non-wettable.

50. The collector of claim 2 wherein the fluid and the fluid flow surfaces of said collector are mutually substantially non-wettable.

51. The collector of claim 3 wherein the fluid and the fluid flow surfaces of said collctor are mutually substantially non-wettable.

52. The collector of claim 4 wherein the fluid and the fluid flow surfaces of said collector are mutually substantially non-wettable.

53. The collector of claim 9 wherein the fluid and the fluid flow surfaces of said collector are mutually substantially non-wettable.

54. The collector of claim 10 wherein the fluid and the fluid flow surfaces of said collector are mutually substantially non-wettable.

55. The collector of claim 11 wherein the fluid and the fluid flow surfaces of said collector are mutually substantially non-wettable.

56. The collector of claim 12 wherein the fluid and the fluid flow surfaces of said collector are mutually substantially non-wettable.

57. The collector of claim 17 wherein the fluid and the fluid flow surfaces of said collector are mutually substantially non-wettable.

58. The collector of claim 18 wherein the fluid and the fluid flow surfaces of said collector are mutually substantially non-wettable.

59. The collector of claim 19 wherein the fluid and the fluid flow surfaces of said collector are mutually substantially non-wettable.

60. The collector of claim 20 wherein the fluid and the fluid flow surfaces of said collector are mutually substantially non-wettable.

61. The collector of claim 25 wherein the fluid and the fluid flow surfaces of said collector are mutually substantially non-wettable.

62. The collector of claim 26 wherein the fluid and the fluid flow surfaces of said collector are mutually substantially non-wettable.

63. The collector of claim 27 wherein the fluid and the fluid flow surfaces of said collector are mutually substantially non-wettable.

64. The collector of claim 28 wherein the fluid and the fluid flow surfaces of said collector are mutually substantially non-wettable.

65. The collector of claim 33 wherein the fluid and the fluid flow surfaces of said collector are mutually substantially non-wettable.

66. The collector of claim 34 wherein the fluid and the fluid flow surfaces of said collector are mutually substantially non-wettable.

67. The collector of claim 35 wherein the fluid and the fluid flow surfaces of said collector are mutually substantially non-wettable.

68. The collector of claim 36 wherein the fluid and the fluid flow surfaces of said collector are mutually substantially non-wettable.

69. The collector of claim 41 wherein the fluid and the fluid flow surfaces of said collector are mutually substantially non-wettable.

70. The collector of claim 42 wherein the fluid and the fluid flow surfaces of said collector are mutually substantially non-wettable.

71. The collector of claim 43 wherein the fluid and the fluid flow surfaces of said collector are mutually substantially non-wettable.

72. The collector of claim 44 wherein the fluid and the fluid flow surfaces of said collector are mutually substantially non-wettable.

* * * * *